Feb. 2, 1954   L. BLASCZYK   2,667,663
METHOD OF FORMING A BODY OF SALT
Filed Aug. 6, 1949
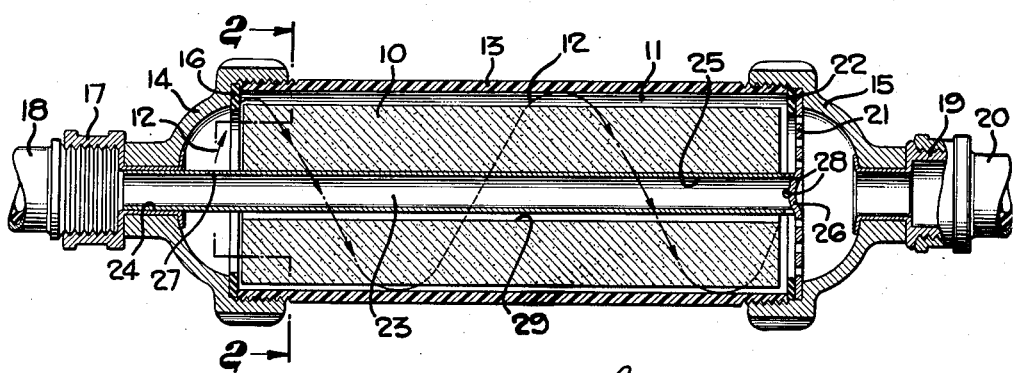
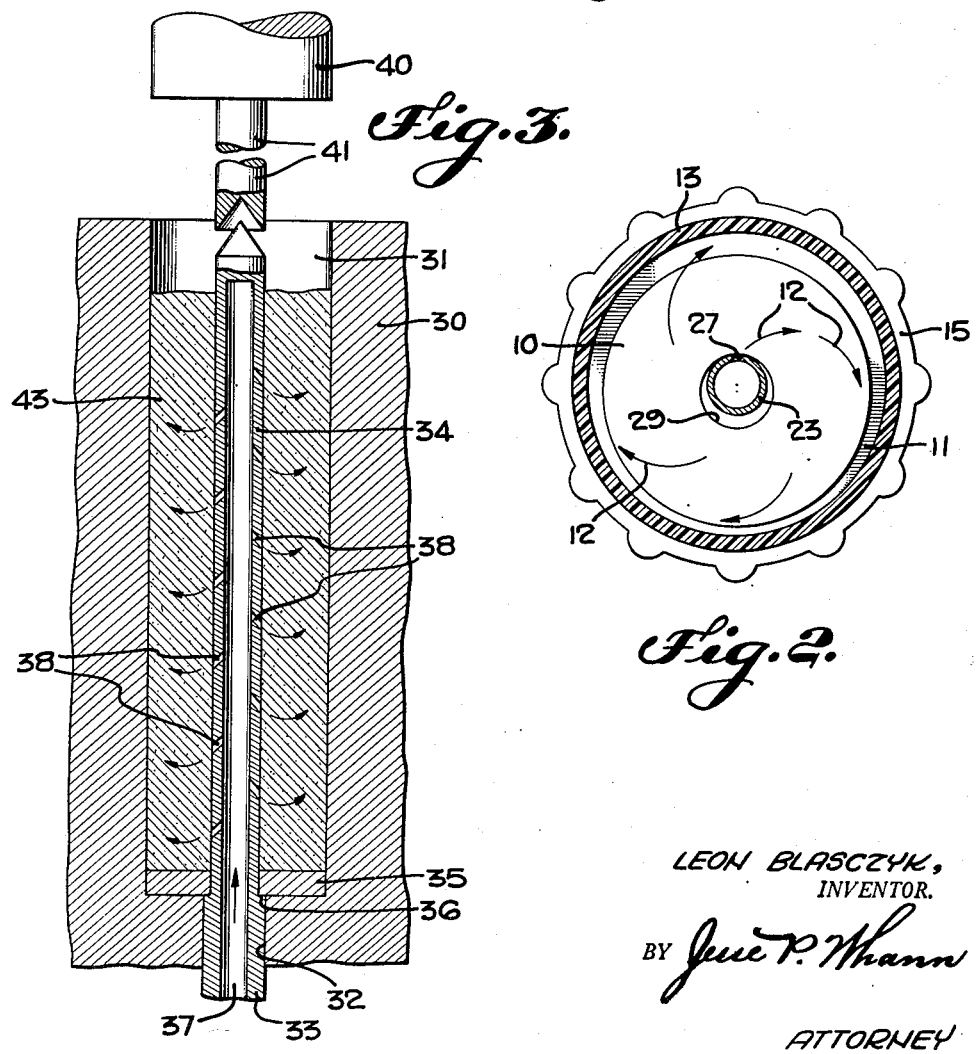
LEON BLASCZYK,
INVENTOR.
BY Jesse P. Whann
ATTORNEY Patented Feb. 2, 1954

2,667,663

UNITED STATES PATENT OFFICE 2,667,663

METHOD OF FORMING A BODY OF SALT

Leon Blasczyk, Glendale, Calif.

Application August 6, 1949, Serial No. 109,025

3 Claims. (Cl. 18—55)

My invention relates to a method for applying substances to soils and to plant life to promote growth of plant life.

It is an object of the invention to prepare a body of material or materials, this body being referred to hereinafter as a briquette.

It is an object of the invention to provide a simple method for applying nitrogen to the soil or for applying pest controls to plants and to soil. Nitrogen in some form or other is necessary if plant health and growth are to be maintained. Some growing plants have the power to absorb and assimilate the traces of ammonium and free nitrogen from the air, while all plants are capable of absorbing nitrogen through their roots. In my invention I prepare a simple briquette containing ammoniacal nitrogen which is to be dissolved and entrained in water which is fed to the soil, in an amount corresponding to the nitrogen absorbing ability of plant roots, namely about 1% of soluble ammoniacal nitrogen.

It is an object of the invention to prepare a briquette of novel form and a device likewise of novel form and having parts to support the briquette while water is caused to flow across the surfaces of the briquette to dissolve material from the surface.

In the preferred practice of the invention, I have established a briquette density and control the rate of dissolution in the device provided for this purpose, so as to obtain a solution of required strength for fertilizing purposes. Also, the briquette is of such size as to fertilize a prescribed area of lawn. At the present time, I make the briquette of such size that when dissolved and sprinkled onto the lawn it will provide a proper fertilization for a lawn of 150 square feet area. Accordingly, the lawn area to be treated may be readily computed and the number of briquettes needed thereby determined.

It is a further object of the invention to produce a briquette comprising a solid mass of ammonium sulphate, and a method of making this briquette so as to provide the briquette with qualities which will be hereinafter described in detail.

Further objects and advantages of the invention will be brought out in the following part of the specification wherein I have described a preferred embodiment of my invention in detail for the purpose of disclosure without limiting the scope of the invention set forth in the appended claims.

Referring to the drawings which are for illustrative purposes only:

Fig. 1 is a longitudinal sectional view of a briquette produced by my invention and the applicator in which it is used.

Fig. 2 is a cross section taken as indicated by the line 2—2 of Fig. 1.

Fig. 3 is a schematic sectional view showing a portion of the method of forming the briquette.

In Fig. 1, I show a cylindric briquette 10 of dissoluble material supported substantially coaxially within a cylindric chamber 11 so that water may circulate in a helical path around the exterior of the briquette, to dissolve substance from the exterior of the briquette which will be carried by the water to a point of application.

The dispensing device comprises a wall 13 of transparent material, with end walls 14 and 15 on the ends of the transparent tube 13. At least one of the end walls 14 and 15 is detachable, so as to provide a chamber construction formed of parts separable to provide access to the chamber whereby a briquette 10 may be placed therein. The end wall 14 is shown threaded onto the tube 13 and the washer 16 is provided to seal the joint against leakage. The end wall 14 is provided with an external hose coupling 17 whereby it may be threaded onto a hose 18. The end wall 15, also shown threaded on the end of the tubular member 13 is provided with a coupling 19 to receive a nozzle 20 or other water distributing means. A screen element consisting of a perforated plate 21 is disposed within the member 15 across the adjacent end of the tubular member 13, which screen is held in place by a washer 22. A tube 23 projects from the opening 24 of the member 14, axially through the chamber 11, and between the free end 25 of the tube 23 and the central portion of the perforated plate 21, means of engagement are provided for holding the end portion 25 of the tube 23 in axial alignment. This means of engagement consists of a projection 26 in the central portion of the plate 21 arranged to engage the extremity of the tube 23, as shown.

The water from the hose 18 flows directly into the tube 23 and from this tube 23 into the chamber 11 through a radial opening 27 in the tube wall near the front end of the tube, and through a plurality of ports at the extreme opposite end of the tube 23 formed by cutting notches 28 in the tube end. The openings 27 and 28 of the tube 23 are proportioned so that a greater portion of the water flows outwardly through the notches 28 and then forwardly through the openings of the screen, and a lesser portion of the water passes through the radial opening 27 into the front end of the chamber 11 so that it will circulate across the surface of the briquette 10 with a swirling movement as indicated by arrows 12. The suction produced by issue of water through the notches 28 causes some flow of water along the surface of the tube 23, but the principal dissolving flow is externally of the briquette 10.

The briquette 10 has an opening 29 axially therethrough to receive the tube 23, whereby the tube will act to support the briquette 10 in the chamber 11 in such position that the external surface of the briquette 10 will be spaced from the tubular member 13, thereby providing an annular space around the briquette through which the dissolving flow of water may swirl. The briquette 10 comprises substantially a single cylindric crystal of ammonium sulphate and therefore contains slightly over 20% of ammoniacal nitrogen, which is a valuable plant food. The briquette 10 is formed as will be hereinafter described. Owing to its formation, the briquette 10 is gradually reduced by surface dissolution as the water flows through the chamber 11, instead of immediately working up and crumbling in the presence of water, as is characteristic of masses of salts such as ammonium sulphate. Also, in my dispensing device, the proportioning of the flows of water through the notches 28 and the opening 27 produces a substantially constant proportioning of the salt content of the water which passes through the nozzle 29, and this proportion is closely adhered to regardless of variations in the rate of flow of water through the nozzle 29. A feature of the device is that when the briquette 10 is used in conjunction therewith, a consistent 1% solution of the salt in the water is obtained. The briquette carries a small quantity of coloring matter, namely 1/50 of 1% resorcinolphthalein, which results in coloring the water yellowish green, this coloring of the water serving as an indication of the dissolved salt being carried by the water. When this color disappears from the water stream, the user understands that the briquette 10 has been entirely dissolved.

The briquette 10 is made so as to constitute a substantially continuous or single crystal of salt in the following manner. Ammonium sulphate, which ordinarily has a moisture content of about 16% is dried at a temperature slightly below the temperature at which ammonium sulphate disintegrates so as to reduce the water content of the ammonium sulphate to about 12%. The surfaces of the dried salt grains or crystals are moistened and the entire mass of salt grains is, without delay, subjected to heavy compression. In other words, the grains of salt are forced together under heavy pressure before the moisture on the surfaces of the grains has been absorbed into the grains. When the moisture is first applied to the surfaces of the grains, these surfaces have a cementitious or tacky consistency, so that when the grains are pressed together the surfaces will cement, thereby forming the small grains or crystals into a large crystal of salt. While the salt mass is under compression, the moisture, which was originally applied to the surfaces of the grains becomes substantially evenly distributed throughout the compressed salt mass. The amount of water added to the dried salt crystals is about 3% by weight, of the briquette thus formed, giving the briquette a moisture content of slightly less than the normal content designated as being about 16%. In Fig. 3, I schematically show my apparatus for producing the briquette 10. A die 30 is provided having a cylindric opening 31, there being an axial opening 32 leading from the opening or die chamber 31. A retractible stem 33 extends through this opening 32 and has a portion 34 projecting upwardly within the chamber 31, there being an ejection disc 35 in the bottom of the chamber 31 engaged by the annular shoulder 36. The stem 33 and its extension 34 has therein a steam passage 37, and the extension has therein a plurality of steam outlet openings 38. A plunger 40 is provided having downwardly projecting stem 41 aligned with the stem extension 34.

In the use of the die shown in Fig. 3, the salt is ground and is subjected to a heat of 75° C. for ten minutes to dehydrate the grains of salt. While the salt is hot, and without material cooling thereof, it is placed in the die chamber 31. In Fig. 3, I show a mass 43 of dried salt grains in the chamber 31 surrounding the stem extension 34. Immediately after the placing of the salt 43 in the chamber 31, wet steam is passed through the passage and out through the openings 38 into the salt to moisten the surfaces of the salt. Then, without delay, the plunger 40 is lowered. The stem 41 of the plunger 40 moves downwardly and at the same time the stem 33 is retracted so that the stem 41 occupies the position of the extension 34 and passes down through the opening in the disc 35 as the plunger 40 engages the salt 43 and then compresses the same in the die chamber 31. The plunger 40 is caused to apply a pressure of about 4 tons per square inch to the mass of salt 43, forcing the salt grains tightly together while the surfaces of the grains are tacky, producing a cementing of the grains and resulting in the formation of a briquette which will not crumble, will not readily break upon being dropped onto the floor and which will not crumble in the presence of water. The plunger 40 and its stem 41 are lifted. The stem 33 is then moved back into the position in which it is shown in full lines in Fig. 3 and its upward movement is continued so that the shoulder 36 will engage the disc 35 to move it upwardly and thereby eject the briquette from the cavity of the mould 30.

I claim:

1. A method of forming a body comprising principally ammonium salt, comprising: applying heat to a plurality of grains of said salt for a period of time sufficient to remove more than 3% of moisture therefrom; applying about 3% of moisture to the surfaces of said grains; and immediately thereafter pressing said grains together so that by surface cementation they will be held together with such homogeneity as to resist rapid absorption of water into the body of salt.

2. A method of forming a body comprising principally ammonium salt, comprising: applying heat to a plurality of grains of said salt for a period of time sufficient to remove more than 3% of moisture therefrom; applying about 3% of moisture to the surfaces of said grains while they are hot; and under heat and pressure forcing said grains together so that by surface cementation they will be held together with such homogeneity as to resist rapid absorption of water into the body of salt thereby formed.

3. A method of forming a body comprising principally ammonium salt, comprising: applying heat to a plurality of grains of said salt for a period of time sufficient to remove more than 3% of moisture therefrom; applying moisture to the surfaces of said grains while they are hot;

and under heat and pressure in excess of 1000 lbs. per sq. inch forcing said grains together so that by surface cementation they will be held together with such homogeneity as to resist rapid absorption of water into the body of salt thereby formed.

LEON BLASCZYK.

References Cited in the file of this patent

UNITED STATES PATENTS

| Number | Name | Date |
| --- | --- | --- |
| 338,924 | Carson et al. | Mar. 30, 1886 |
| 1,466,571 | Thorssell et al. | Aug. 28, 1923 |
| 1,919,707 | Adam et al. | July 25, 1933 |
| 2,021,093 | Kreisler | Nov. 12, 1935 |
| 2,218,790 | Gifford | Oct. 22, 1940 |
| 2,220,227 | Gifford | Nov. 5, 1940 |
| 2,287,759 | Hardesty et al. | June 23, 1942 |
| 2,439,716 | Canfield et al. | Apr. 13, 1948 |
| 2,486,213 | Schulerud | Oct. 28, 1949 |